(No Model.)

A. G. JENNINGS.
COTTON GIN.

No. 378,167. Patented Feb. 21, 1888.

WITNESSES:
Gustave Dieterich
F. F. Bourne.

INVENTOR
A. G. Jennings
BY Briesen & Steele
ATTORNEYS.

UNITED STATES PATENT OFFICE.

ABRAHAM G. JENNINGS, OF BROOKLYN, NEW YORK.

COTTON-GIN.

SPECIFICATION forming part of Letters Patent No. 378,167, dated February 21, 1888.

Application filed March 17, 1887. Serial No. 231,236. (No model.)

*To all whom it may concern:*

Be it known that I, ABRAHAM G. JENNINGS, of Brooklyn, Kings county, New York, have invented a new and Improved Cotton-Gin, of which the following is a full, clear, and exact description.

The object of my invention is to separate the fibers from the seed of cotton in such a manner that the fibers will not be broken and torn, as is ordinarily the case in ginning cotton, but will be left at their full length, thereby increasing the valuable qualities of the cotton as ginned.

The invention consists in an air-spout for directing a current of air against the cotton for conveying it by air-pressure within reach of the ginning-roller.

The invention also consists in details of construction more fully hereinafter set forth.

Reference is to be had to the accompanying drawings, forming part of this specification, in which—

Figure 1:
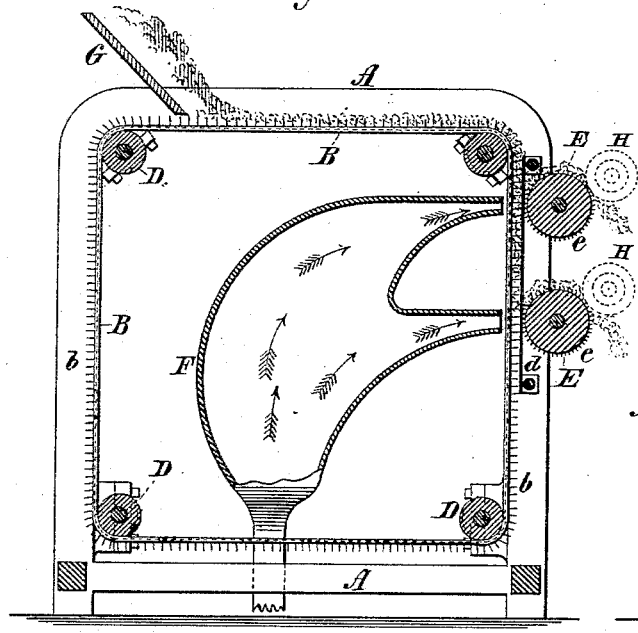
Figure 2:
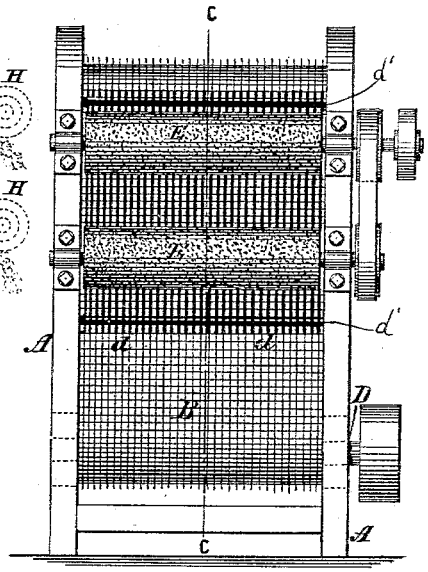
Figure 3:
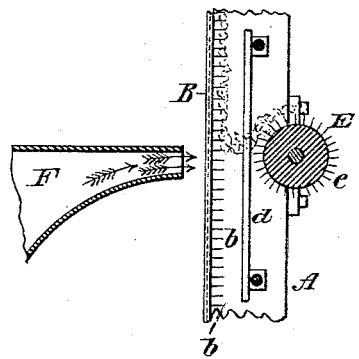
Figure 4:
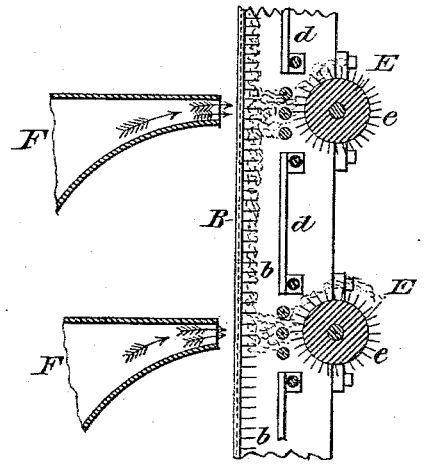

Figure 1 is a sectional view of my improved cotton-gin, taken on the line *c c*, Fig. 2. Fig. 2 is an end view of the same. Fig. 3 is a sectional view of a portion of the cotton-carrier, air-spout, grating, and roller; and Fig. 4 is a sectional view showing a modification of the grating.

A, in the accompanying drawings, represents the frame of my improved cotton-gin.

B is the cotton-carrier, suitably mounted on rollers D D. The carrier B is perforated, being preferably made of wire-cloth, and has secured to it teeth, cards, or pins *b*, by which to hold the cotton. The rollers D D are preferably journaled in bearings in the frame A, and they may be driven by belting or by other suitable means.

Journaled on the frame A are the ginning-rollers E, which carry the teeth or pins *e*.

Between the carrier B and the rollers E is a grating, *d*, preferably of bars, the openings in the grating being sufficiently narrow to prevent cotton-seed passing through. The grating or bars *d* may be supported in position by cross-bars *d'*, carried by the frame A, and having the bars *d* secured to them, or in any other suitable manner.

F is an air-spout, each of whose discharge-orifices terminates on the inner side of the carrier B opposite a roller, E. The spout F receives the air from any suitably-arranged mechanism.

G is a hopper or incline upon which the cotton to be ginned may be placed.

H are doffers suitably arranged for removing the ginned cotton from the rollers E.

In the modification shown in Fig. 4 the grating *d* opposite each roller E is horizontal instead of vertical.

This cotton-gin operates as follows: The cotton to be ginned is fed to the carrier B in any suitable manner, but preferably from the incline G. It is then carried along on said carrier till it is opposite to the discharge-orifice of the air-spout F, where it is blown against and partly through the grating *d*. This grating does not allow the seed to pass, but the fibers projected between the grate-bars *d* are caught by the teeth *e* on the roller E and drawn outward from between the grating, leaving the seed free, which then drop down and are caught in any suitable receiver. The cotton fibers are removed from the roller E by means of doffer H, in the usual manner. The cotton is no longer on the carrier when received by the roller E, and its fibers are therefore not drawn in two directions, but are withdrawn by the roller without tearing, thus leaving them their full length.

The gin may be provided with any desired number of rollers E and spouts F, two such spouts and rollers being shown in the drawings.

Having now described my invention, what I claim is—

1. In a cotton-gin, the grating *d* and air-spout F, in combination with the carrier B, and means, substantially as described, for drawing the fibers of the cotton through the grating, as set forth.

2. In a cotton-gin, the air-spout F, combined with the grating *d*, carrier B, and roller E, substantially as described.

3. In a cotton-gin, the combination of a perforated carrier with an air-spout on one side and a grating on the other side, whereby the air from said spout forces the fiber against said grating, as set forth.

ABRAHAM G. JENNINGS.

Witnesses:
CHARLES G. M. THOMAS,
HARRY M. TURK.